(12) United States Patent
Takemura et al.

(10) Patent No.: US 10,093,043 B2
(45) Date of Patent: *Oct. 9, 2018

(54) MOLD STRUCTURE, TRANSFER MOLDING APPARATUS, AND TRANSFER MOLDING METHOD

(71) Applicant: OMRON Corporation, Kyoto-shi, Kyoto (JP)

(72) Inventors: Koichi Takemura, Kyoto (JP); Tomofusa Shibata, Kyoto (JP); Yoshinori Ito, Kyoto (JP); Yoshikaga Taguchi, Kyoto (JP)

(73) Assignee: OMRON Corporation, Kyoto (JP)

( * ) Notice: Subject to any disclaimer, the term of this patent is extended or adjusted under 35 U.S.C. 154(b) by 528 days.

This patent is subject to a terminal disclaimer.

(21) Appl. No.: 14/704,276

(22) Filed: May 5, 2015

(65) Prior Publication Data

US 2015/0343678 A1 Dec. 3, 2015

Related U.S. Application Data

(63) Continuation of application No. PCT/JP2013/053100, filed on Feb. 8, 2013.

(30) Foreign Application Priority Data

Nov. 5, 2012 (JP) ................... 2012-243995

(51) Int. Cl.
*B29C 43/36* (2006.01)
*B29C 43/52* (2006.01)
(Continued)

(52) U.S. Cl.
CPC .............. *B29C 43/36* (2013.01); *B29C 43/52* (2013.01); *B29C 59/02* (2013.01); *B29C 59/026* (2013.01);
(Continued)

(58) Field of Classification Search
CPC ....... B29C 43/36; B29C 43/52; B29C 43/361; B29C 59/02; B29C 59/026;
(Continued)

(56) References Cited

U.S. PATENT DOCUMENTS 9,116,264 B2 * 8/2015 Makuta ................ G02B 6/0011
9,162,405 B2 * 10/2015 Takemura .......... B29D 11/00663
(Continued)

FOREIGN PATENT DOCUMENTS

JP    2001-311783 A    11/2001
JP    2001-338446 A    12/2001
(Continued)

OTHER PUBLICATIONS

International Search Report issued in corresponding Application No. PCT/JP2013/053100, dated Apr. 2, 2013 (4 pages).

*Primary Examiner* — Robert J Grun
*Assistant Examiner* — Jerzi H Moreno Hernandez
(74) *Attorney, Agent, or Firm* — Osha Liang LLP

(57) ABSTRACT

A mold structure has a first mold, a second mold relatively connectable to and disconnectable from the first mold, a heater on at least one of the first and second molds, a transfer member on at least one of the first and second molds, that is relatively movable and separable from the at least one of the first and second molds on which the transfer member is disposed, a transfer surface formed on the transfer member that is placed in contact with a resin sheet fed between the first and second molds to perform transfer molding onto the resin sheet, and a moving mechanism that moves the at least one of the first and second molds on which the transfer member is disposed and the transfer member relative to each other.

17 Claims, 15 Drawing Sheets

(51) Int. Cl.
  *B29C 59/02* (2006.01)
  *B29C 51/08* (2006.01)
  *B29C 43/02* (2006.01)
(52) U.S. Cl.
  CPC .......... *B29C 43/361* (2013.01); *B29C 51/082* (2013.01); *B29C 51/087* (2013.01); *B29C 2043/025* (2013.01); *B29C 2059/023* (2013.01)
(58) Field of Classification Search
  CPC ........ B29C 2043/025; B29C 2059/023; B29C 51/087; B29C 51/082; B30B 9/00; B30B 15/06; B29L 11/00; B29L 17/00; G11B 7/26
  See application file for complete search history.

(56) References Cited

U.S. PATENT DOCUMENTS 9,452,572 B2 * 9/2016 Takemura ........ B29D 11/00663
2008/0302255 A1 * 12/2008 Koivukunnas ........ B29C 59/046 101/27
2010/0034911 A1 * 2/2010 Mori ................... B29C 35/0888 425/89
2013/0285285 A1 * 10/2013 Shimoda ................ B82Y 10/00 264/293
2013/0337102 A1 * 12/2013 Hardt ..................... B29C 59/02 425/385
2014/0020575 A1 * 1/2014 Chretien ............... B30B 15/064 101/27
2014/0117587 A1 * 5/2014 Aoya ..................... B29C 33/06 264/403

FOREIGN PATENT DOCUMENTS

| JP | 2005-310286 A | 11/2005 | |
| JP | 2006-026928 A | 2/2006 | |
| JP | 2006255900 A * | 9/2006 | ............. B29C 59/02 |
| JP | 2007230241 A * | 9/2007 | ............. B29C 59/02 |
| JP | WO 2013008410 A1 * | 1/2013 | ............. B29C 33/06 |

* cited by examiner

Fig. 5(a)
Fig. 5(b)
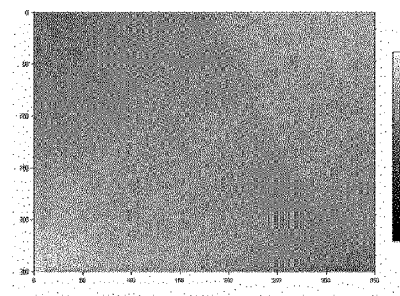
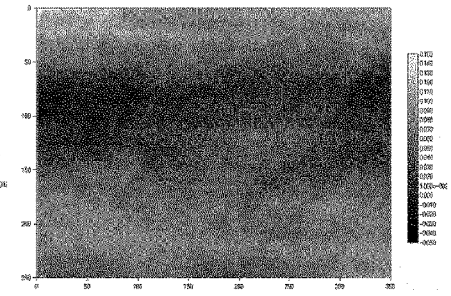
Fig. 5(c)
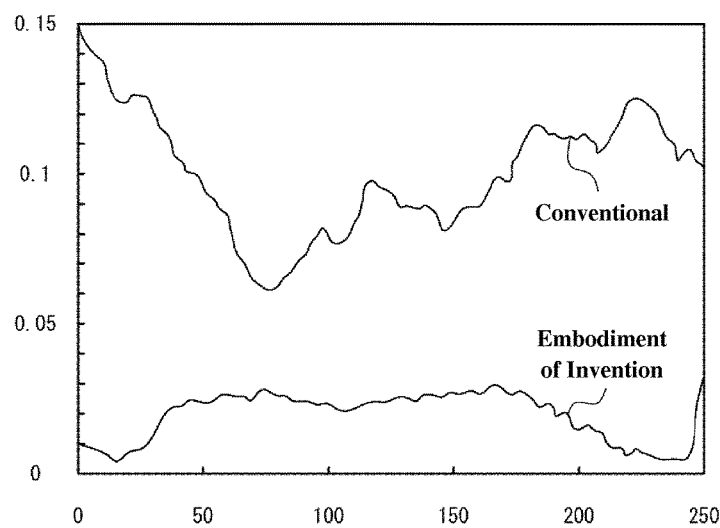

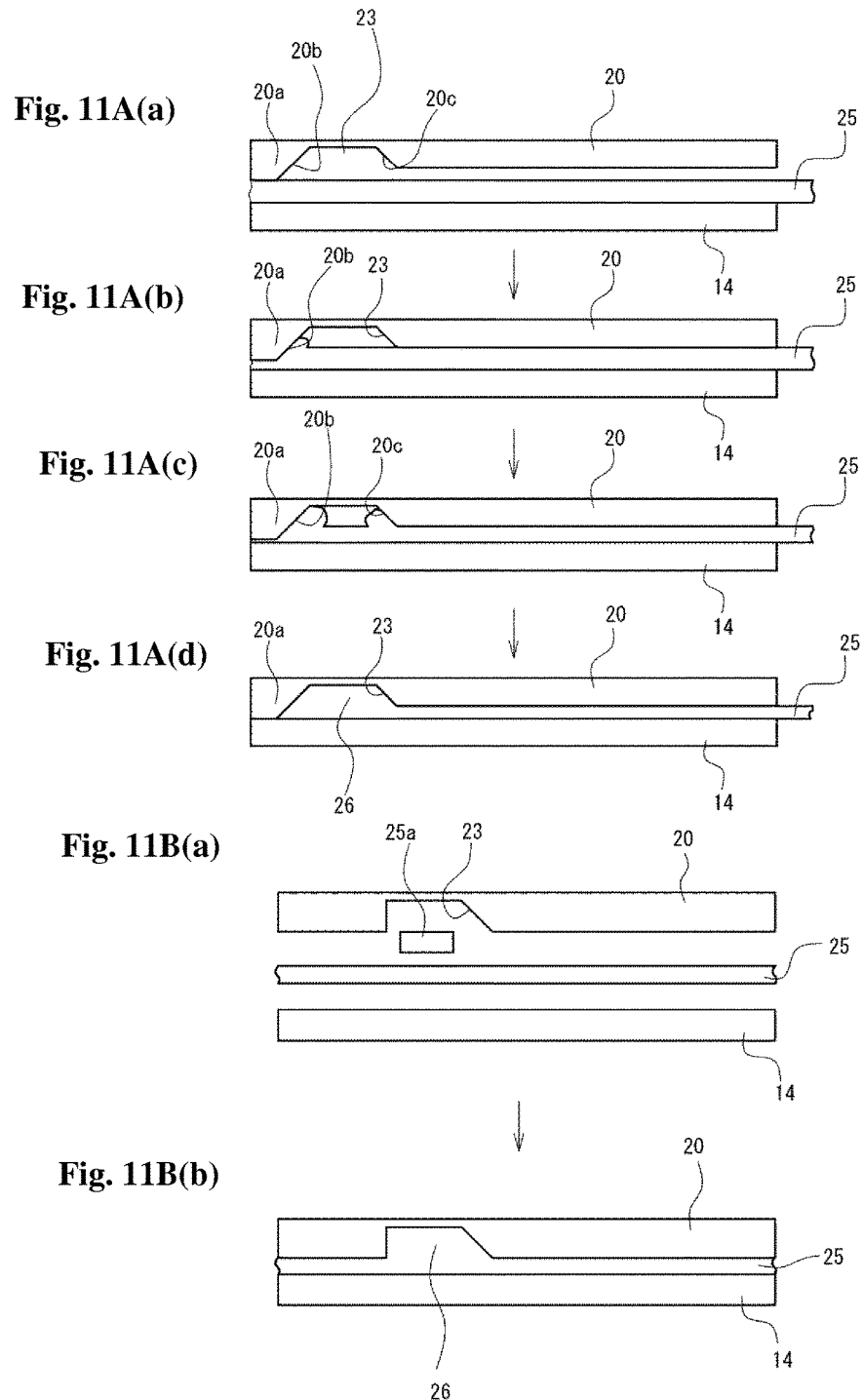

MOLD STRUCTURE, TRANSFER MOLDING APPARATUS, AND TRANSFER MOLDING METHOD

BACKGROUND

Field

The present invention relates to a mold structure, a transfer molding apparatus, and a transfer molding method.

Related Art

Transfer molding apparatuses known in the art heat and pressurize a resin film to transfer a pattern of minute protrusions and recesses from a transfer plate onto the resin film (refer to, for example, Patent Literature 1).

Patent Literature 1: Japanese Unexamined Patent Application Publication No. 2005-310286

SUMMARY

However, such a transfer molding apparatus known in the art includes a transfer plate integrated in a mold. When the transfer plate needs replacement due to damage for example, the replacement work is allowed only within the mold that can be open and closed. If the replacement is performed during the molding process, the mold at high temperature may burn the worker. The workability in replacing the transfer plate is thus low.

With the transfer plate being integrated with the mold, the entire structure needs to be heated and cooled. The efficiency of heat exchange is low.

One or more embodiments of the present invention provides a structure that allows easy and quick replacement of a transfer member and improves the efficiency of heat exchange.

One or more embodiments of the present invention provides a mold structure including a first mold, a second mold relatively connectable to and disconnectable from the first mold, a heater on at least one of the molds, a transfer member on at least one of the molds, and a mechanism. The transfer member is relatively movable and separable from the at least one mold. The transfer member has a transfer surface that is placed in contact with a resin sheet fed between the molds to perform transfer molding onto the resin sheet. The mechanism is configured to move the mold and the transfer member relative to each other.

This structure allows only the transfer member that undergoes micro processing to move relatively and separate from the mold, and thus allows easy replacement of the transfer member at a position to which the transfer member has been moved and separated from the mold.

One or more embodiments of the present invention provides a transfer molding apparatus including the mold structure.

According to one or more embodiments of the present invention, the transfer member further includes a cooling unit configured to cool the transfer member that is maintained in contact with the resin sheet and has been moved and separated from the mold.

This structure allows transfer molding from the transfer surface of the transfer member to the resin sheet, moves and separates the transfer member from the mold, and cools the resin sheet via the transfer member with the cooling unit. This enables efficient cooling in a short period of time while preventing the resin sheet from being affected by heat from the molds.

According to one or more embodiments of the present invention, the cooling unit is located in a non-transfer area at least when transfer molding is not being performed.

This structure prevents the cooling unit and the molds from thermally affecting each other. In particular, the molds are not cooled by the cooling unit when transfer molding is not being performed. This allows the subsequent transfer molding to start smoothly.

According to one or more embodiments of the present invention, the cooling unit may include an intake unit configured to supply air to a surface of the transfer member opposite to the transfer surface of the transfer member moved and separated from the mold.

This structure allows the resin sheet to be cooled with a simple mechanism of supplying air to the transfer member. The transfer member is separate from the mold. Thus, the molds are not cooled with air supplied from the intake unit. This allows the subsequent transfer molding to start smoothly as compared with the mold structure that is cooled entirely.

According to one or more embodiments of the present invention, the cooling unit may include a cooling member configured to come in contact with a surface of the transfer member opposite to the transfer surface of the transfer member moved and separated from the mold.

This structure more efficiently cools the resin sheet with the cooling member placed in contact with the transfer member. The cooling member may be water-cooling, or may use other cooling methods.

According to one or more embodiments of the present invention, the cooling member has a temperature not more than a glass-transition temperature.

According to one or more embodiments of the present invention, the cooling member has one surface coming in contact with the surface of the transfer member opposite to the transfer surface, and the other surface having a heat insulator thereon.

In this structure, the heat insulator prevents the cooling member from absorbing heat from parts other than the resin sheet. This structure thus effectively cools the resin sheet via the transfer member. This shortens the time taken for the cooling process of the resin sheet, and thus shortens the cycle time for the transfer molding.

According to one or more embodiments of the present invention, the mold located opposite to the cooling unit across the resin film includes a heater, and a heat insulator arranged between the resin film and the heater.

In this structure, the heat insulator reduces the amount of heat released from the molds to the cooling member. More specifically, each mold is prevented from being cooled more than necessary, whether or not the cooling member is arranged. This allows the subsequent transfer molding to start smoothly.

According to one or more embodiments of the present invention, the cooling member is movable in a direction intersecting with a direction in which the molds are connected and disconnected.

This structure allows the cooling member to move to a retracted position so that the cooling member is prevented from cooling the molds when the resin sheet is not cooled.

According to one or more embodiments of the present invention, the transfer member includes transfer members on both sides of the resin sheet in a manner relatively movable and separable from the respective molds, and the cooling unit includes two members each configured to cool a surface of the transfer member opposite to the transfer surface of the transfer member moved and separated from the mold, and the molds have substantially the same temperature.

This structure allows uniform cooling of the two surfaces of the resin sheet, and thus allows the resin sheet to undergo curing in an appropriate state without uneven heat deformation of the resin sheet due to cooling.

According to one or more embodiments of the present invention, at least one of the upper mold and the lower mold is reciprocable in a direction intersecting with a direction in which the molds are connected and disconnected.

This structure allows cooling of the resin sheet or replacement of the transfer member to be performed at a position where the resin sheet or the transfer member has been moved laterally, and improves the workability.

According to one or more embodiments of the present invention, the cooling unit includes a member configured to cool a surface of the transfer member opposite to the transfer surface, and the mold located where cooling is provided by the cooling unit is configured to have a higher temperature than the opposing mold.

This structure allows the transportation line for the resin sheet to be installed near the mold at a lower temperature. This allows the mold structure to be compact.

One or more embodiments of the present invention provides a transfer molding method including placing a resin sheet between a first mold and a second mold facing each other, supporting the resin sheet between the molds with at least one surface of the resin sheet being in contact with a transfer surface of a transfer member, performing transfer molding on the resin sheet by heating at least one of the molds, releasing the molds and moving and separating the transfer member from the mold, and cooling the transfer member moved and separated from the mold.

According to one or more embodiments of the present invention, the cooling step includes supplying air to a surface of the transfer member opposite to the transfer surface.

According to one or more embodiments of the present invention, the cooling step includes placing the cooling member in contact with the surface of the transfer member opposite to the transfer surface.

One or more embodiments of the present invention allows the transfer member to be moved and separated from the mold, and thus allows easy replacement of the transfer member.

BRIEF DESCRIPTION OF THE DRAWINGS

FIG. 5(a) is a photograph showing the illumination state of a light guide plate according to the first embodiment, FIG. 5(b) is a photograph showing the illumination state of a conventional light guide plate, and FIG. 5(c) is a graph showing the amount of light transmission in the states shown in FIGS. 5(a) and 5(b).

FIGS. 11A(a) to 11A(d) are schematic views illustrating a method for forming a thick portion of a resin sheet according to another embodiment.

FIGS. 11B(a) and 11B(b) are schematic views illustrating a method for forming a thick portion of a resin sheet according to another embodiment.

DETAILED DESCRIPTION

Embodiments of the present invention will now be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. The terms indicating specific directions or positions used herein (e.g., the terms including upper, lower, side, and edge) for easy understanding of the invention with reference to the drawings do not limit the technical scope of the invention. The description herein is merely exemplary in nature, and is not intended to limit the invention, its applications, or uses.

First Embodiment
Configuration

Figure 1:
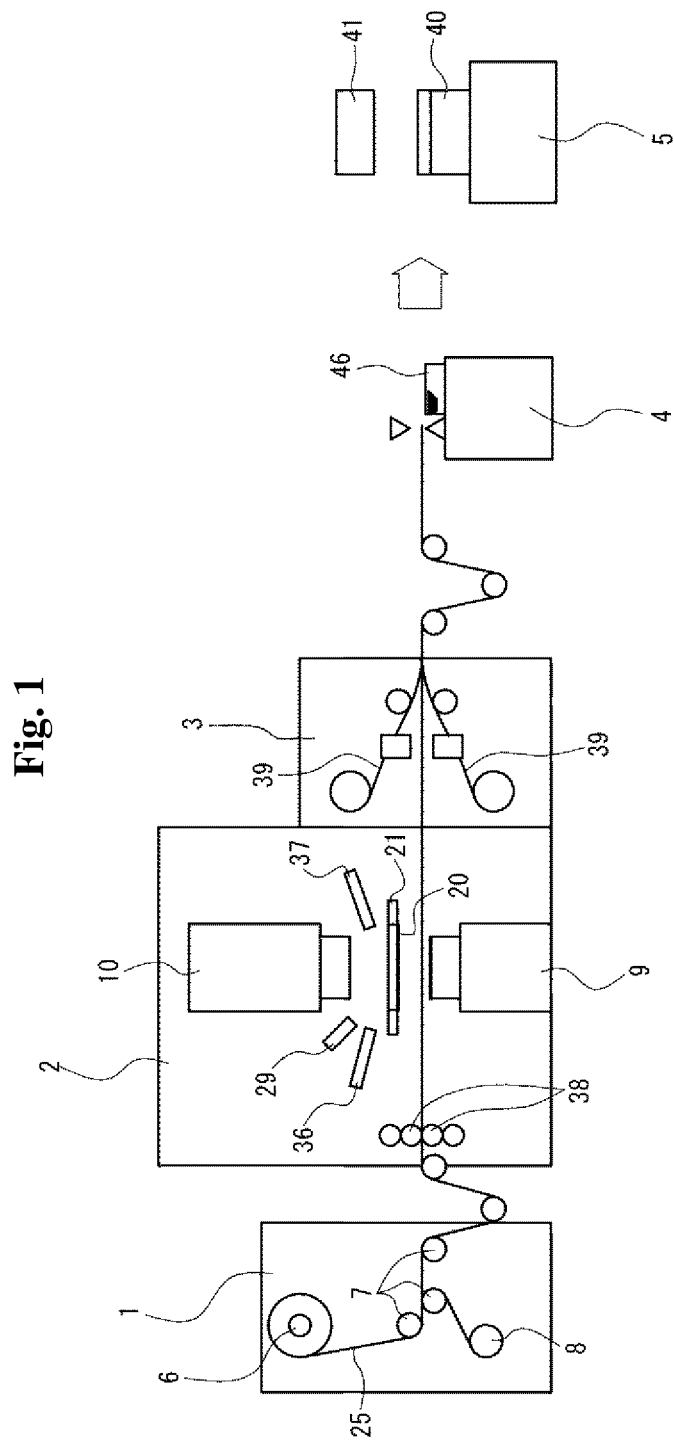
FIG. 1 is a schematic front view of a light guide plate manufacturing system according to a first embodiment.

FIG. 1 is a schematic view of a light guide plate manufacturing system according to a first embodiment. The light guide plate manufacturing system includes a material feeder 1, a transfer molding apparatus 2, a film applicator 3, a cutter 4, and a shaping apparatus 5.

The material feeder 1 rewinds a resin sheet 25 from a main roller 6 and feeds the sheet to the transfer molding apparatus 2. The resin sheet 25 is transported by a plurality of rollers 7 arranged midway to the transfer molding apparatus 2. Immediately after passing the second one of the rollers 7, a protective sheet bonded to the resin sheet 25 is separated and wound by a winding roller 8. The resin sheet 25 is made of polycarbonate (with a melting point of about 240° C. and a glass-transition temperature of about 150° C.).

Figure 2:
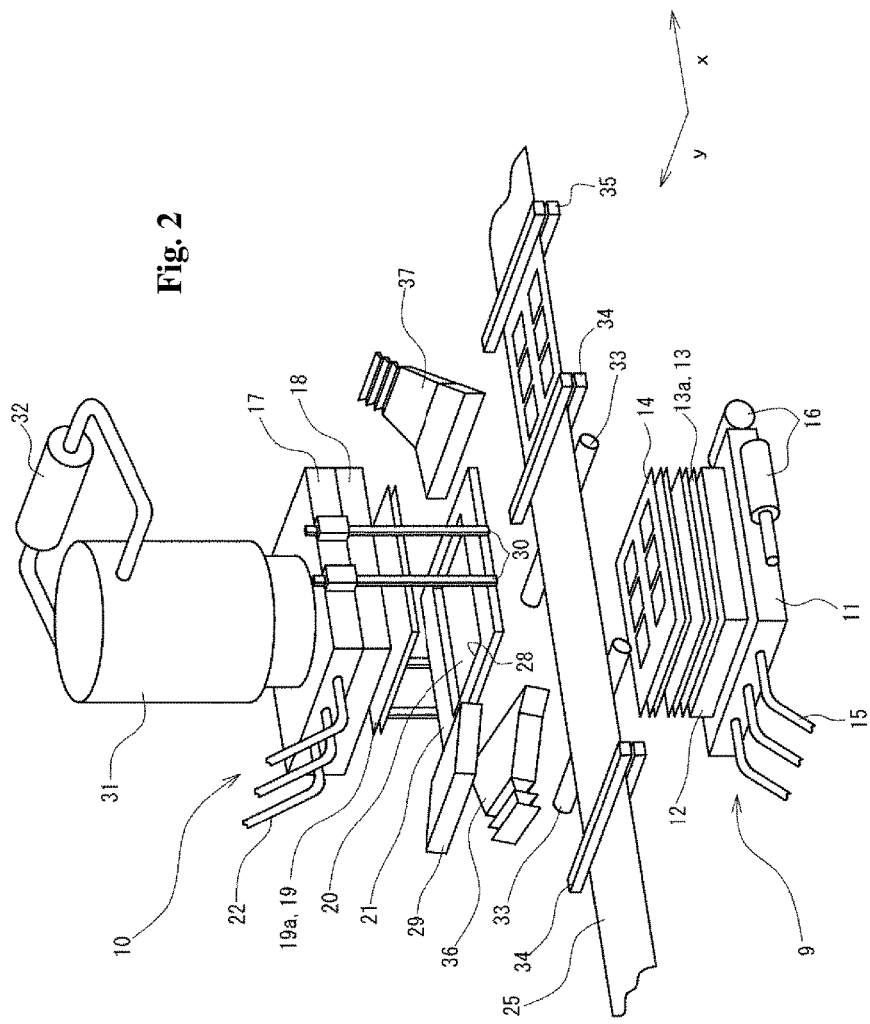
FIG. 2 is a schematic partially exploded perspective view of a transfer molding apparatus shown in FIG. 1.

As shown in FIG. 2, the transfer molding apparatus 2 includes a lower mold 9 and an upper mold 10. The lower mold 9 includes a lower mold support 11, on the upper surface of which a lower mold intermediate plate 12, a lower mold heat insulating plate 13, and a lower mold transfer plate 14 are arranged in this order.

The lower mold support 11 is a stainless steel (SUS) plate that is rectangular as viewed from above. The lower mold support 11 has a plurality of through-holes extending across its both sides, through which heaters 15 and thermocouples (not shown) are arranged. When energized, the heaters 15 can heat the lower mold support 11, which then eventually heats the lower mold transfer plate 14 to an intended temperature via the lower mold intermediate plate 12 and the lower mold heat insulating plate 13. In the first embodiment, the temperature to which the lower mold support 11 is heated by the energized heaters 15 is regulated to about 180° C.

Like the lower mold support 11, the lower mold intermediate plate 12 is a stainless steel (SUS) plate that is rectangular as viewed from above.

The lower mold heat insulating plate 13 includes a plurality of heat insulating sheets 13a that are laminated together (FIG. 2 shows the sheets as vertically separate from each other). The heat insulating sheets 13a are made of resin material such as polyimide. The degree of heat insulation may be adjusted by changing the number of heat insulating sheets. In the first embodiment, the lower mold heat insulating plate 13 includes five heat insulating sheets to allow the lower mold transfer plate 14 to be heated to about 150° C. but the lower mold support 11 to be heated to about 180° C. This prevents the resin sheet 25 from deforming under heat from the lower mold support 11. This structure thus allows the transportation line for the resin sheet 25 to be installed near the lower mold 9, and eliminates the need to increase the distance between the molds when the molds are released, and thus downsizes the transfer molding apparatus 2. When the molds are closed to heat the resin sheet 25, the lower mold heat insulating plate 13 further prevents heat from the upper mold 10 from escaping toward the lower mold. The lower mold heat insulating plate 13 further prevents the lower mold support 11 from being cooled when the resin sheet 25 is cooled.

The lower mold transfer plate 14 is a nickel-chromium alloy plate that is rectangular as viewed from above. The lower mold transfer plate 14 has an upper surface functioning as a transfer surface, which has a plurality of hemispherical recesses with a depth in the order of submicrometers at predetermined intervals in X-direction and Y-direction. This sheet can form a plurality of hemispherical protrusions on the lower surface of the resin sheet 25, onto which the transfer is to be performed. The surface with such protrusions serves as a reflecting surface that reflects light emitted from a light source toward the upper surface to allow the light to be emitted from the upper surface. The recesses may not be hemispherical but may be in other shapes. For example, the recesses may be conical. The transfer surface may not have the recesses but may have protrusions.

The lower mold 9 is movable on a horizontal plane in X-direction and Y-direction when driven by, for example, a servo motor (not shown). The amount of movement of the lower mold 9 is detected by a micrometer 16, and is used to finely adjust the positions of the lower mold 9 in X-direction and Y-direction. The lower mold may be moved manually.

The upper mold 10 includes an upper mold support 17, on the lower surface of which an upper mold intermediate plate 18, an upper mold heat insulating plate 19, and a retainer plate 21 retaining an upper mold transfer plate 20 are arranged in this order.

Like the lower mold support 11, the upper mold support 17 is a stainless steel (SUS) plate that is rectangular as viewed from above. The upper mold support 17 has a plurality of through-holes extending across its both sides, through which heaters 22 and thermocouples (not shown) are placed. When energized, the heaters 22 can heat the upper mold support 17 to about 280° C.

Like the upper mold support 17, the upper mold intermediate plate 18 is a stainless steel (SUS) plate that is rectangular as viewed from above.

Like the lower mold heat insulating plate 13, the upper mold heat insulating plate 19 includes a plurality of heat insulating sheets 19a that are laminated together. The heat insulating sheets 19a are made of resin material such as polyimide. The upper mold heat insulating plate 19 includes two heat insulating sheets. This structure allows the upper mold transfer plate 20 to be heated to about 240° C. When supported between the upper mold 10 and the lower mold 9, the resin sheet 25 can melt sufficiently.

Figure 3A:
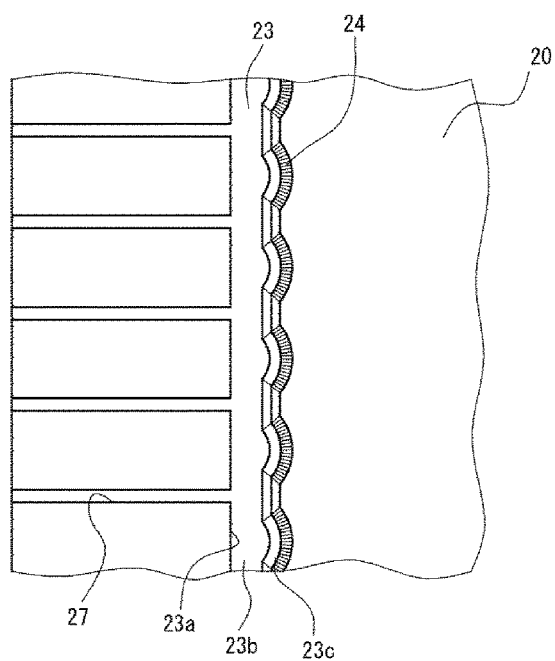
FIG. 3(a) is a partial plan view of a transfer plate for an upper mold shown in FIG. 2.
Figure 3B:
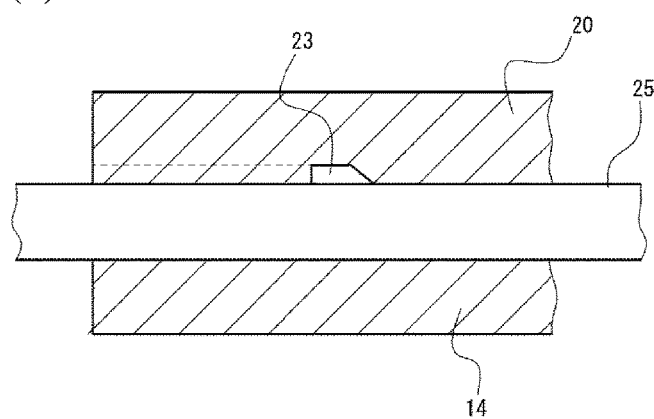
FIG. 3(b) is a schematic partial cross-sectional view of the mold shown in FIG. 2.
Figure 3C:
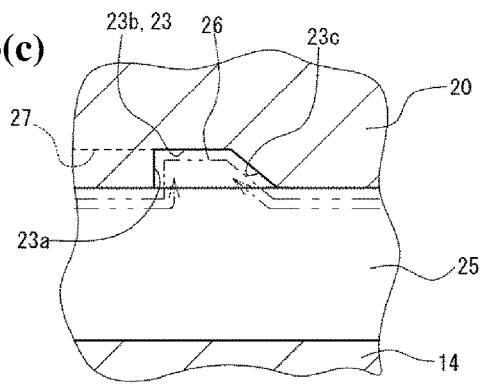
FIG. 3(c) is a partially enlarged view of FIG. 3(b).

Like the lower mold transfer plate 14, the upper mold transfer plate 20 is a nickel-chromium-alloy plate that is rectangular as viewed from above. As shown in FIGS. 3(a) to 3(c), the upper mold transfer plate 20 has a recess 23 extending in the width direction in its lower surface. As shown in FIG. 3(c), the recess 23 is defined by a perpendicular surface 23a, a bottom surface 23b, an inclined surface 23c, and both end faces (not shown). The inclined surface 23c includes a plurality of arc-shaped areas 24, which are aligned in the width direction. Each arc-shaped area 24 includes a plurality of protrusions (not shown), which are arranged circumferentially. Each protrusion has a substantially triangular cross section and extends radially.

The recess 23 receives a molten portion of the resin sheet 25 and forms a thick portion 26. Examples of the resin sheet 25 may range from an extremely thin film and a film with a thickness of 0.2 to 0.3 mm used in the first embodiment to a still thicker film. The thick portion 26 has a height in the order of submillimeters. In the first embodiment, the thick portion 26 has a height of 0.2 mm. The protrusions on the inclined surface have a height (surface roughness) in the order of submicrometers. In the first embodiment, the protrusions have a height of 0.2 μm. The area including such protrusions serves as a transfer surface, which bends light from a plurality of light sources arranged on the end face near the thick portion 26 to reduce leaking of the light from the inclined surface.

The upper mold transfer plate 20 has a plurality of grooves 27 on its lower surface. The grooves 27 communicate with the recess 23 and extend to the side of the upper mold transfer plate 20. According to one or more embodiments of the present invention, each groove 27 extends in a direction (X-direction) perpendicular to the width direction in which the recess 23 extends (Y-direction). This minimizes the length of the groove 27. Each groove 27 is located between the adjacent arc-shaped areas 24, because the molten resin flows most slowly between the adjacent arc-shaped areas 24 and thus bubbles easily remain there. This structure effectively removes bubbles from the recess 23. Each groove 27 only needs to have a depth of not less than the depth of the recess 23. In the first embodiment, each groove 27 is as deep as the recess 23. Each groove 27 has a width to minimize the overflow of the molten resin (resin sheet 25) from the recess 23 and also to prevent bubbles from remaining in the recess 23.

The grooves 27 communicating with the recess 23 and extending to the outside are located between the adjacent arc-shaped areas 24. Such grooves 27 efficiently guide air in the recess 23 toward the outside when the molten resin flows into the recess 23. The resin flowing into the recess 23 also partially flows into the grooves 27. The grooves 27 have a depth not less than the depth of the recess 23 and thus prevent the air from remaining in the area connecting the recess 23 and the grooves 27 (if the grooves 27 have a smaller depth than the recess 23, the grooves 27 and the recess 23 may form steps between them, where air may be trapped). This structure prevents air from remaining in the recess 23, and prevents voids from forming in the thick portion 26. Although a little air may remain in the recess 23, such air would not cause resin burning. Additionally, a pressure may be applied to eliminate such air in the molten resin and prevent the air from forming voids.

As shown in FIG. 2, the retainer plate 21 is a rectangular stainless steel (SUS) frame with an opening 28 formed in its center. The retainer plate 21 retains the upper mold transfer plate 20 placed on its lower surface and allows the upper mold transfer plate 20 to be exposed upward through the opening 28. The upper surface of the upper mold transfer plate 20 exposed through the opening is irradiated with soft X-rays by a soft X-ray irradiation unit 29. The irradiation removes static electricity from the resin sheet 25 to prevent the surrounding dust or other matter from being attracted to the resin sheet 25 by electrostatic attraction. The retainer plate 21 has rods 30 connected to its two sides, which are driven by, for example, a cylinder (not shown) to raise or lower the retainer plate 21 independently of the operation of raising and lowering the entire upper mold.

The entire upper mold is raised or lowered by a press 31 arranged on the upper surface of the upper mold-retainer plate 17. The press 31 is supplied with air or the air is discharged from the press 31 by an air supply 32 to raise or lower the rods 30 (not shown) and to raise or lower the entire upper mold with the upper mold support 17.

The resin sheet 25 fed by the material feeder 1 is transported between the upper mold 10 and the lower mold 9. The transportation line for the resin sheet 25 includes support rollers 33, which support the lower surface of the resin sheet 25, and positioning grippers 34, which each grip the resin sheet 25 from above and below, in this order at positions near the molds toward the entry side and the exit side of the molds. The support rollers 33 and the positioning grippers 34 can be raised and lowered. The transportation line further includes a transporting gripper 35 downstream. The transporting gripper 35 also grips the resin sheet 25 from above and below like the positioning grippers 34. The transporting gripper 35 reciprocates along the transportation line when driven by a driver (not shown). To transport the resin sheet 25, the positioning gripper 34 is released, and the resin sheet 25 gripped by the transporting gripper 35 is moved downstream on the transportation line. The operations of the support rollers 33 and these grippers will be described below.

An intake duct 36 is arranged above at a position upstream from the molds, and an exhaust duct 37 is arranged above at a downstream position. The intake duct 36 blows out the air supplied from, for example, a compressor (not shown). The air is blown to the resin sheet 25 located between the upper mold 10 and the lower mold 9 obliquely from above. The exhaust duct 37, which is sucked by, for example, a compressor (not shown), sucks the air blown to the resin sheet 25 from the intake duct 36. The air supplied from the intake duct 36 is clean, and the flow of air from the intake duct 36 to the exhaust duct 37 not only cools the resin sheet 25 but also serves as a barrier to prevent dust or other matter from adhering to the surface of the resin sheet 25. As described above, the irradiation with soft X-rays has removed static electricity from the resin sheet 25, and thus prevents dust from being attracted to the resin sheet 25 by electrostatic attraction.

As shown in FIG. 1, application rollers 38, which come in contact with the upper and lower surfaces of the resin sheet 25, are arranged upstream from the molds. The application rollers 38 rotate to transport the resin sheet 25 while removing dust or other matter adhering to each surface of the resin sheet 25.

The film applicator 3 applies a protective film 39 on each of the upper and lower surfaces of the resin sheet 25 that has undergone transfer molding. The protective film 39 protects the resin sheet 25 from damage when colliding with other parts or from dust adhering to the surface of the resin sheet 25 and causing failures.

The cutter 4 cuts the resin sheet 25 that has undergone transfer molding into rectangular portions. The peripheral four sides of the rectangular portions of the resin sheet 25 cut by the cutter 4 are removed by a stamping device (not shown) to form semifinished plates 46. The resulting semifinished plates 46 each include a thick portion 26, and a cutting margin on its end face opposite to the thick portion 26.

Figure 4A:
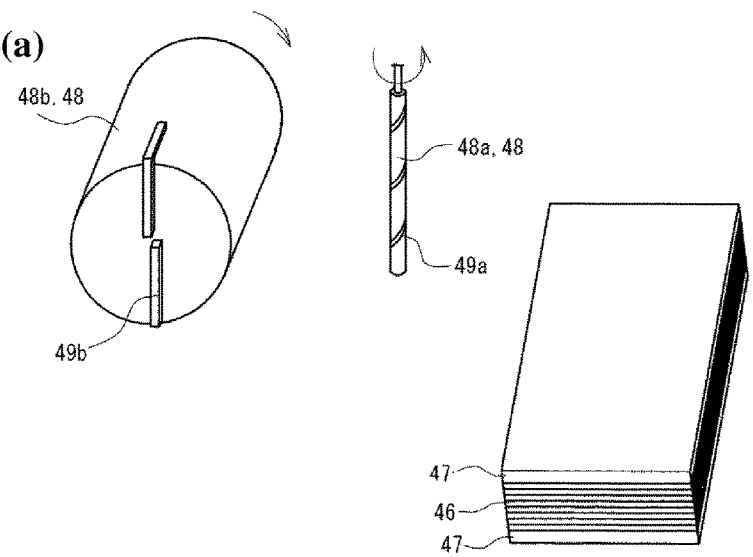
FIG. 4(a) is a diagram illustrating the relationship between semifinished plates and a first cutting tool and a second cutting tool.

The shaping apparatus 5 includes a cutting member 41 for cutting both ends of each semifinished plate 46 (its thick portion 26 and its side opposite to the thick portion 26). The cutting member 41 includes a first cutting tool 48a and a second cutting tool 48b as shown in FIG. 4(a). The cutting tools 48a and 48b rotate when driven by a driver (not shown). The first cutting tool 48a is cylindrical, and includes cutting blades 49a arranged on its outer circumferential surface at positions symmetric to each other with respect to a point about the rotation axis. The first cutting tool 48a is used for rough finishing. The second cutting tool 48b is disk-shaped, and includes cutouts at two symmetric positions on its outer circumference, and includes cutting blades 49b extending radially on its front surface. The second cutting tool 48b is used for mirror finishing. A specific method for cutting with the cutting member 41 will be described later.

Operation

The operation of the light guide plate manufacturing system with the above structure will now be described.

Preparation Process

The upper mold 10 is raised to open the molds, and the distal end of the resin sheet 25 fed from the material feeder 1 is gripped by the transporting gripper 35. The transporting gripper 35 is moved, and then the resin sheet 25 is gripped by the positioning gripper 34 to locate the resin sheet 25 within an area where the upper mold 10 and the lower mold 9 face each other (transporting process).

The molds are preheated by energizing the heaters 15. With the heat insulating plate incorporated in each of the upper mold 10 and the lower mold 9 as described above, the upper mold transfer plate 20 in the upper mold 10 is heated to about 240° C., whereas the lower mold transfer plate 14 in the lower mold 9 is heated to about 150° C. For the lower mold 9 located near the resin sheet 25, the temperature of the upper surface is regulated substantially to the glass-transition temperature. This prevents failures of the resin sheet 25, or prevents the resin sheet 25 from bending downward under heat to come in contact with the lower mold transfer plate 14 (preheating process).

Transfer Molding Process

The support roller 33 and the positioning gripper 34 are lowered to place the resin sheet 25 onto the lower mold transfer plate 14 of the lower mold 9. The press 31 is driven to lower the upper mold 10 so that the transfer surface of the upper mold transfer plate 20 comes in contact with the resin sheet 25. In this state, the press 31 applies a small pressure so that the resin sheet 25 is loosely supported between the upper and lower molds. In this state, the resin sheet 25 is heated to remove water content at its surface portion (preheating process).

When a predetermined time (a first set time) elapses from the start of the preheating process, the press 31 increases its applied pressure. As described above, the resin sheet 25 is made of polycarbonate (with a melting point of about 250° C. and a glass-transition temperature of about 150° C.). The upper mold transfer plate 20 has been heated to 240° C., and thus can heat the resin sheet 25 to a temperature exceeding its melting point. As a result, the resin sheet 25 is molten. Although the lower mold transfer plate 14 in the lower mold 9 has been heated to 180° C., the lower mold heat insulating plate 13 prevents heat from escaping from the lower mold. Thus, the entire area of the resin sheet 25 supported between the molds is heated to a temperature exceeding the melting point, and the resin sheet 25 is molten (heating and pressurizing process).

The resin sheet 25 receives a pressure from the upper mold 10, which is applied by the press 31. This causes a portion of the resin sheet 25 supported between the molds to be thin, and causes a part of the resin sheet 25 (its upper surface part) to flow into the recess 23 formed in the upper mold transfer plate 20. When the molten resin flows into the recess 23, the air in the recess 23 flows along the grooves 27 and is removed outside. The recess 23 is completely filled with the molten resin, which partially flows into the grooves 27. The grooves 27 are as deep as or deeper than the recess 23 (as deep as the recess 23 in the first embodiment). In this case, the air is smoothly removed outside without remaining in the recess 23. The air is not compressed in the recess 23, and thus would not cause burning. If a small amount of air remains in the recess 23, a sufficient pressure is applied to eliminate such air and prevent voids from forming in the molten resin.

When a predetermined time (a second set time) elapses from the start of the heating and pressurizing process, the upper mold 10 is raised. In this state, the upper mold transfer plate 20 remains in contact with the resin sheet 25 as the cylinder is driven. Air is then supplied through the intake duct 36 onto the upper mold transfer plate 20. The heated upper mold support 17 is located away from the resin sheet 25, and the air is blown onto the upper mold transfer plate 20 from the intake duct 36. In this case, the resin sheet 25 is cooled only with the upper mold transfer plate 20. The resin sheet 25 is cooled efficiently in a short time without being affected by heat from the upper mold support 17. More specifically, the resin sheet 25 can be cooled in a short period to 150° C., which is the glass-transition temperature of polycarbonate used for the resin sheet 25, or to a lower temperature. This structure does not cool the upper mold support 17 and the upper mold intermediate plate 18, and thus reduces energy loss and enables the subsequent transfer molding process to start smoothly in a short time (cooling process).

When a predetermined time (a third set time) elapses from the start of the cooling process, or specifically when the molten resin is cooled to solidify into a stable shape, the upper mold transfer plate 20 is raised and released from the molded piece. The support rollers 33 are also raised to release the molded portion from the lower mold transfer plate 14. This forms the thick portion 26 having a height in the order of submillimeters, or with a thickness of 0.2 mm, on the upper surface of the resin sheet 25. The inclined surface of the thick portion 26 includes a plurality of sawtooth-like protrusions of the order of submicrometers, or specifically with a size of 14 μm. In contrast, semicircular protrusions are formed on the lower surface of the resin sheet 25 at constant intervals in X-direction and Y-direction (releasing process).

Although protrusions of the order of submicrometers can be formed on the resin sheet 25 by conventional transfer molding, such conventional molding cannot form the thick portion 26 of the order of submillimeters on the resin sheet 25 at the same time. The transfer molding apparatus 2 including the above mold structure enables both protrusions of the order of submicrometers and the thick portion 26 of the order of submillimeters to be formed in the resin sheet 25 at the same time. The above transfer molding process melts the entire resin sheet 25 supported between the molds, and thus generates no internal stress in the semifinished plate 46 resulting from the subsequent curing. This allows light from a plurality of LEDs arranged on the end face near the thick portion 26 to be transmitted through the structure to illuminate uniformly on the entire upper surface of the structure excluding the thick portion 26 without uneven illumination.

Film Applying Process

The resin sheet 25 that has undergone transfer molding with the transfer molding apparatus 2 is further transported downstream, and a protective film 39 is applied to each of the upper and lower surfaces of the resin sheet 25 by the film applicator 3. The protective film 39 protects the semifinished plate 46 from damage or scratches when colliding with other parts, or from the surrounding dust or other matter adhering to the surfaces of the semifinished plate 46 and causing failures. After the semifinished plate 46 undergoes subsequent machining to complete the light guide plate, the protective films 39 are removed in the process of assembling the light guide plate with a liquid crystal panel.

Cutting Process

The resin sheet 25 having the protective films 39 on its both sides is further transported downstream, and is cut with the cutter 4 into rectangular portions in the direction of transportation in units of semifinished plates. Each semifinished plate 46 includes a thick portion 26, and a cutting margin used in the shaping process on its end face opposite to the thick portion 26 (its cut surface). The cut surface of each semifinished plate 46 includes a beveled surface 46a on its edge in the direction of cutting performed by the first cutting tool 48a described below. The beveled surface 46a forms an angle of about 3 degrees with the cut surface and extends such that a beveled portion will remain after the cutting margin is removed.

Shaping Process

Eight semifinished plates 46 obtained through the cutting process are stacked on one another such that the thick portions 26 of adjacent plates are on the different sides.

Dummy plates 47 are placed on the upper and lower surfaces of the stacked semifinished plates 46.

The semifinished plates 46 and the dummy plates 47 are cut on their one end face first with the first cutting tool 48a, and then with the second cutting tool 48b.

As shown in FIG. 4(a), the first cutting tool 48a is arranged to have its rotating axis parallel to the cut surfaces of the semifinished plates 46, and cuts the end faces of the semifinished plates 46 with its cutting blades arranged on the outer circumference while it is rotating clockwise in the figure. The semifinished plates 46 stacked on one another are sandwiched between the dummy plates 47, and thus can be cut smoothly without chattering during the cutting process. The semifinished plates 46 have the beveled surface 46a on their edge in the direction of cutting performed by the first cutting tool 48a. The beveled surface 46a extends beyond the cutting margin on the cut surface of the semifinished plates 46. The semifinished plates 46 will not have burrs at their edge when cut by the first cutting tool 48.

Figure 4B:
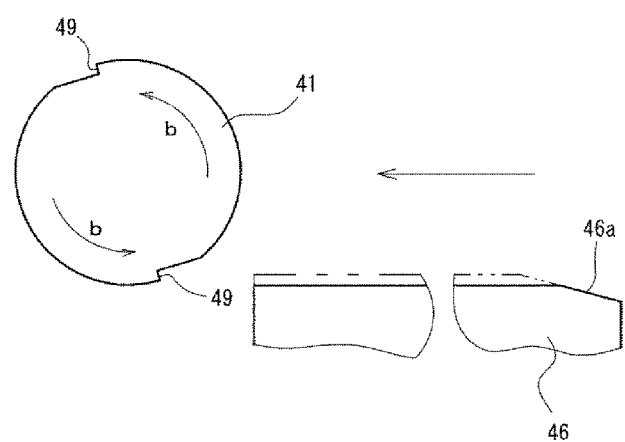
FIGS. 4(b) and 4(c) are diagrams illustrating the relationship between the semifinished plates and the first cutting tool.
Figure 4C:
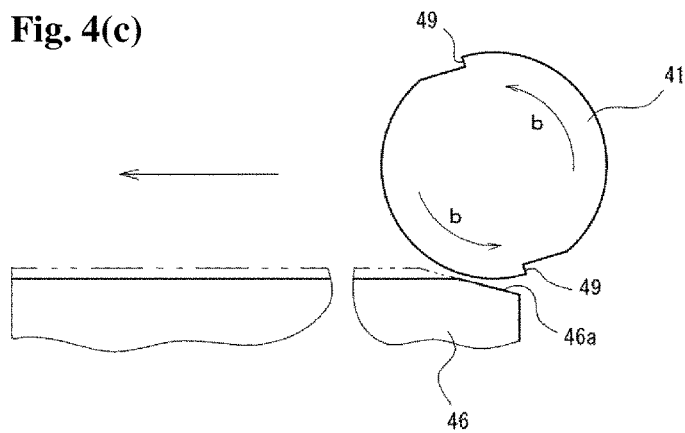

As shown in FIG. 4(b), the second cutting tool 48b is arranged to have its rotating axis perpendicular to the cut surfaces of the semifinished plates 46. The second cutting tool 48b having cutting blades arranged on its surface provides mirror finish on the cut surfaces of the semifinished plates 46. The cutting blades cut the cut surfaces of the stacked semifinished plates 46 while rotating. Without the dummy plates 47 arranged on the upper and lower surfaces, burrs will form on the upper and lower edges of the outermost two semifinished plates 46. In the first embodiment, the upper and lower edges of the outermost two semifinished plates 46 are covered by the dummy plates 47. The dummy plates 47 may have burrs but the semifinished plates 46 do not form burrs.

The completed light guide plate includes a thin portion with a thickness of 0.2 mm and a thick portion with a thickness of 0.5 mm. The thick portion has a substantially trapezoidal cross section. The light guide plate includes a plurality of hemispherical recesses (or protrusions) on its bottom surface. The light guide plate serves as one component of a liquid crystal display, and is assembled with other parts as described below.

Figure 11C:
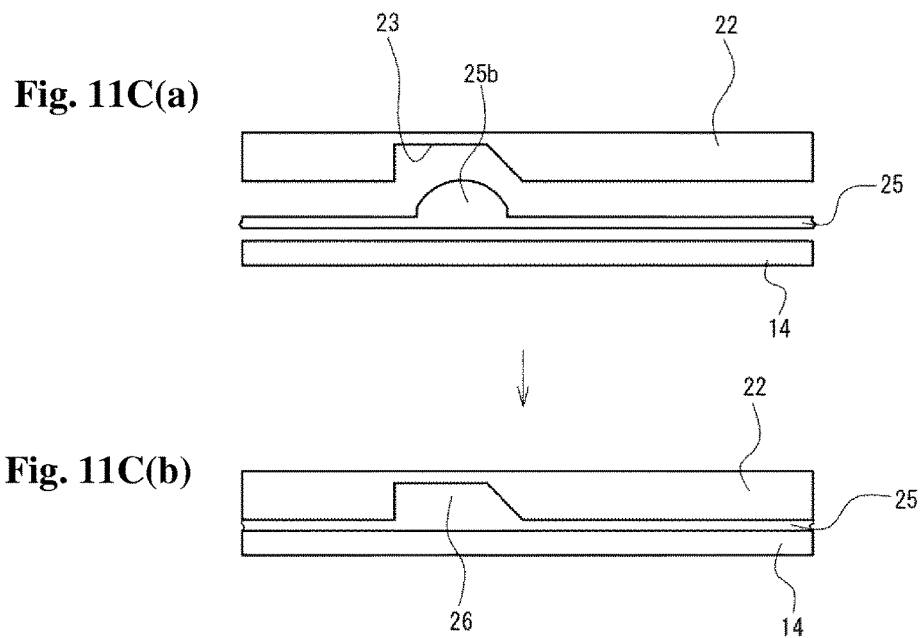
FIGS. 11C(a) and 11C(b) are schematic views illustrating a method for forming a thick portion of a resin sheet according to another embodiment.
Figure 11D:
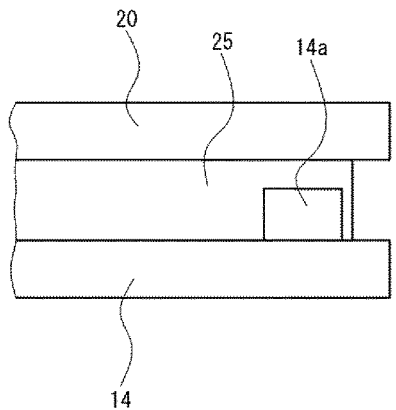
FIGS. 11D(a)-11D(d) are schematic partial cross-sectional views of a transfer plate and a resin sheet according to another embodiment.
Figure 11D:
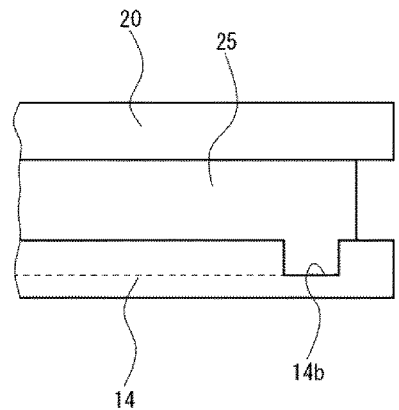
Figure 11D:
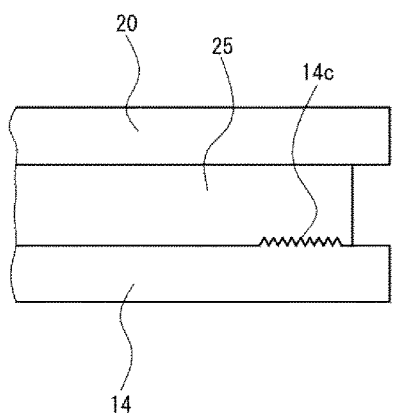
Figure 11D:
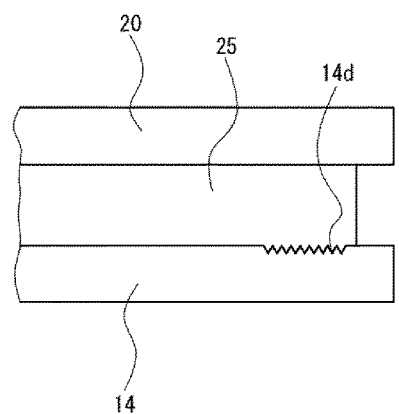
Figure 11E:
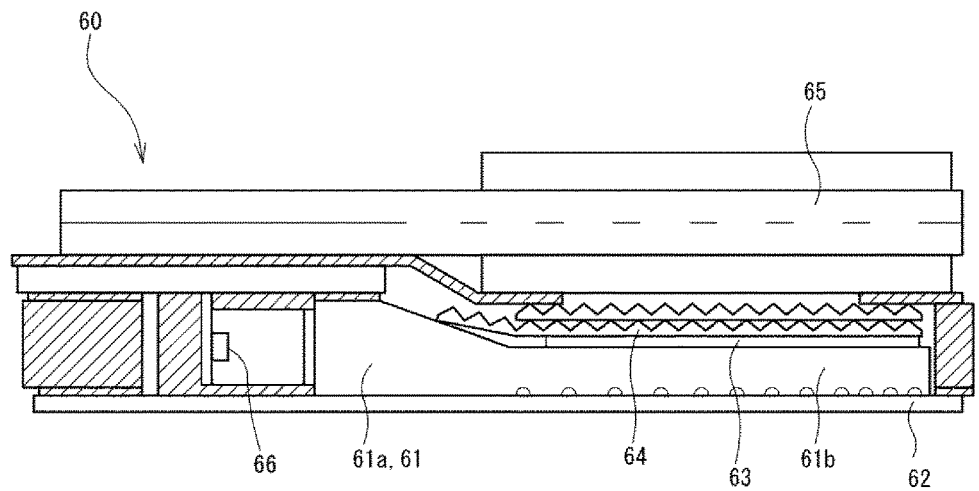
FIG. 11E is a cross-sectional view of a liquid crystal display including the light guide plate according to the first embodiment.

As shown in FIG. 11E, the light guide plate 61 is placed on the upper surface of a base 62. A diffusion plate 63, a prism sheet 64, and a liquid crystal panel 65 are then placed on the upper surface of the light guide plate 61 in this order. An LED 66, which serves as a light source, is then arranged on the surface lateral to the perpendicular surface of the thick portion 61a. This completes a liquid crystal display 60.

In the completed liquid crystal display 60, light emitted from the LED 66 is guided to the thin portion 61b while the protrusions of the thick portion 61a prevent the light from leaking outside. The light is uniformly diffused by the hemispherical recesses at the bottom, and illuminates the liquid crystal panel 65 after passing through the diffusion plate 63 and the prism sheet 64.

The light guide plate may not be combined with the liquid crystal panel 65 but may be used simply as a surface light source device.

The state of double refraction of the light guide plate will now be described. As described above, the resin sheet 25 supported between the upper and lower molds is entirely molten in the transfer molding process. This generates no internal stress in the resulting product and the product has the homogenous composition. Thus, the light guide plate can emit light uniformly from its entire upper surface as shown in FIG. 5(a). However, a conventional light guide plate emits light unevenly from its upper surface as shown in FIG. 5(b).

FIG. 5(c) is a graph showing the difference in the amount of light transmission between p-polarized light and s-polarized light of each of these light guide plates. As the graph shows, the difference in the amount of light transmission is significantly smaller for the light guide plate according to the first embodiment than for the conventional light guide plate.

Second Embodiment

Figure 6:
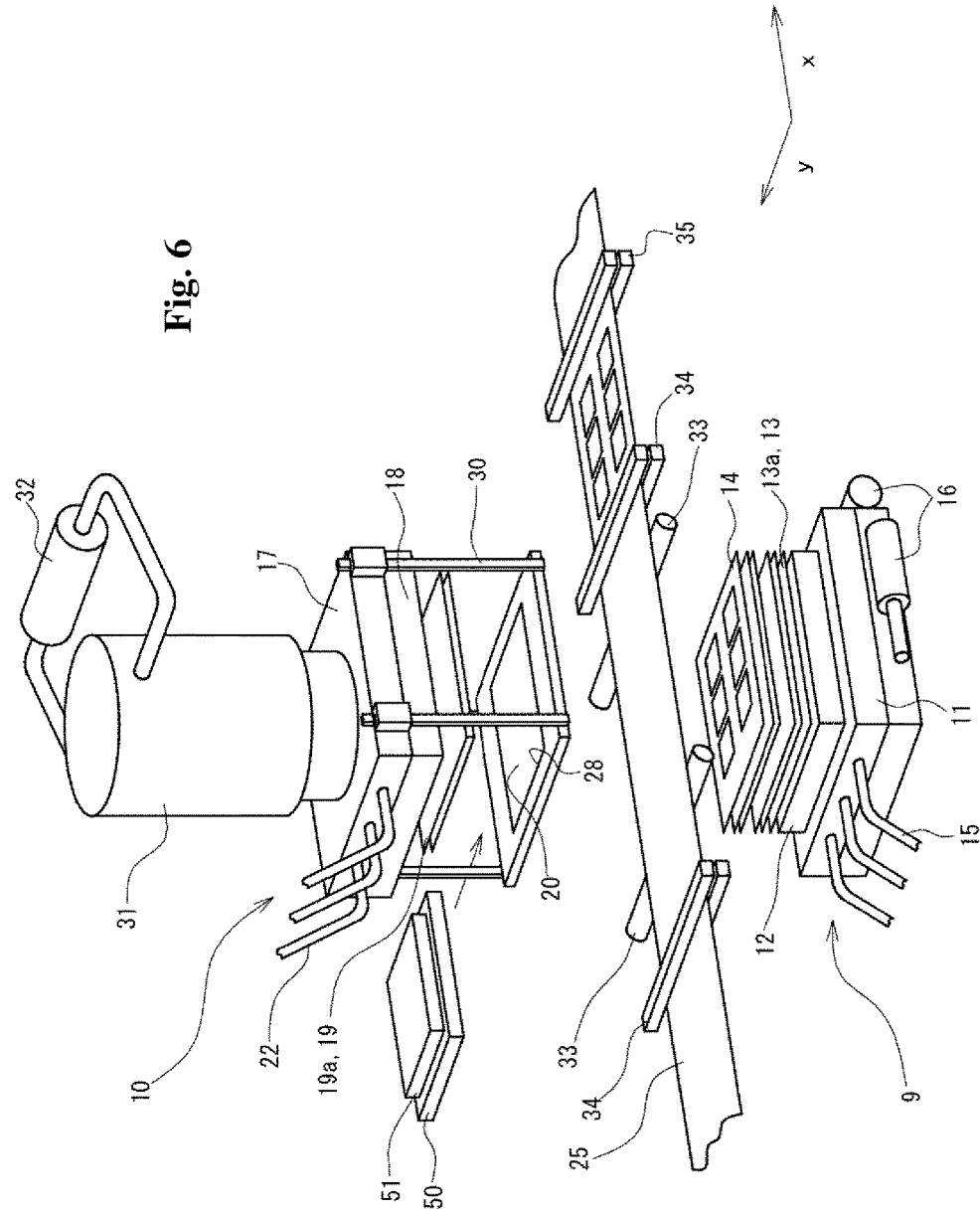
FIG. 6 is a schematic perspective view of a light guide plate manufacturing system according to a second embodiment.

The system shown in FIG. 6 uses a direct cooling method for cooling an upper mold transfer plate 20 by direct contact with a cooling plate 50, instead of using the air cooling method of cooling the upper mold transfer plate 20 with air blown from the intake duct 36.

The cooling plate 50 can reciprocate between a transfer area defined in the molds and a non-transfer area defined outside the molds by a horizontal moving mechanism (not shown). An auxiliary heat insulating plate 51 is formed integrally with the upper surface of the cooling plate 50. When an upper transfer plate is retained on the retainer plate 21, the lower surface of the upper transfer plate can come in contact with the upper surface of the resin sheet 25, and the upper surface of the upper transfer plate can come in contact with the lower surface of the cooling plate 50. The cooling plate 50 is water-cooling, and uses a fluid flowing through a pipe (not shown) to maintain the surface temperature to a constant value (e.g., 20° C.). The other components such as the molds are the same as those in the first embodiment, and the corresponding components are given the same reference numerals and will not be described.

The structure including the cooling plate 50 performs cooling as described below after heating and pressurizing the resin sheet 25. The transfer molding process includes shifting from the state shown in FIG. 7A(a) to cooling performed by raising the upper mold 10 while maintaining the upper mold transfer plate 20 in contact with the resin sheet 25 as shown in FIG. 7A(b), and then laterally placing the cooling plate 50 between the upper mold transfer plate 20 and the upper mold intermediate plate 18 as shown in FIG. 7A(c).

First Cooling Process

Figure 7A:
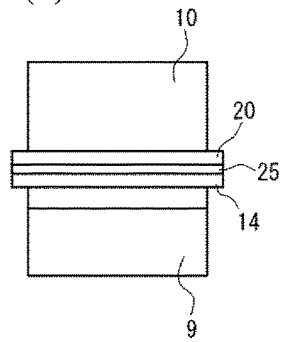
FIGS. 7A(a)-7A(f) are diagrams illustrating the operation of each plate of the transfer molding apparatus shown in FIG. 6.
Figure 7A:
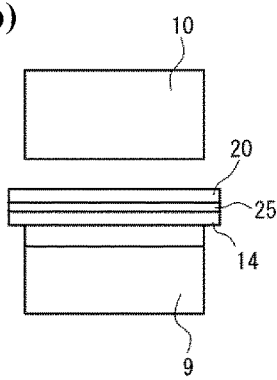
Figure 7A:
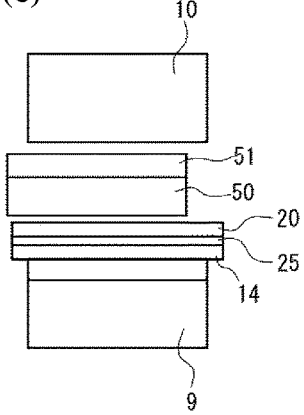
Figure 7A:
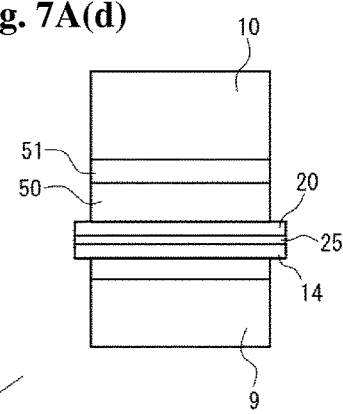
Figure 7A:
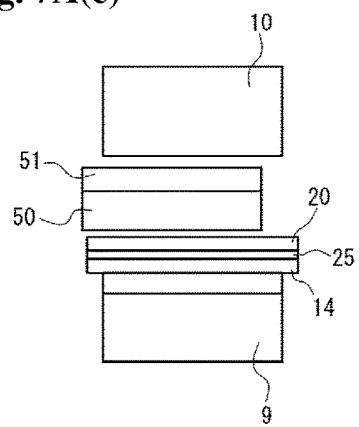
Figure 7A:
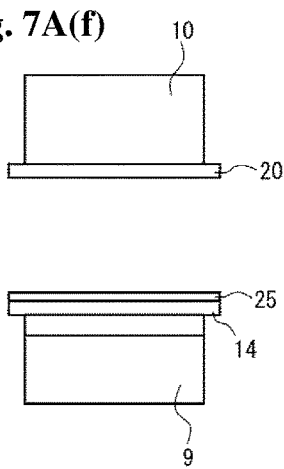
Figure 8:
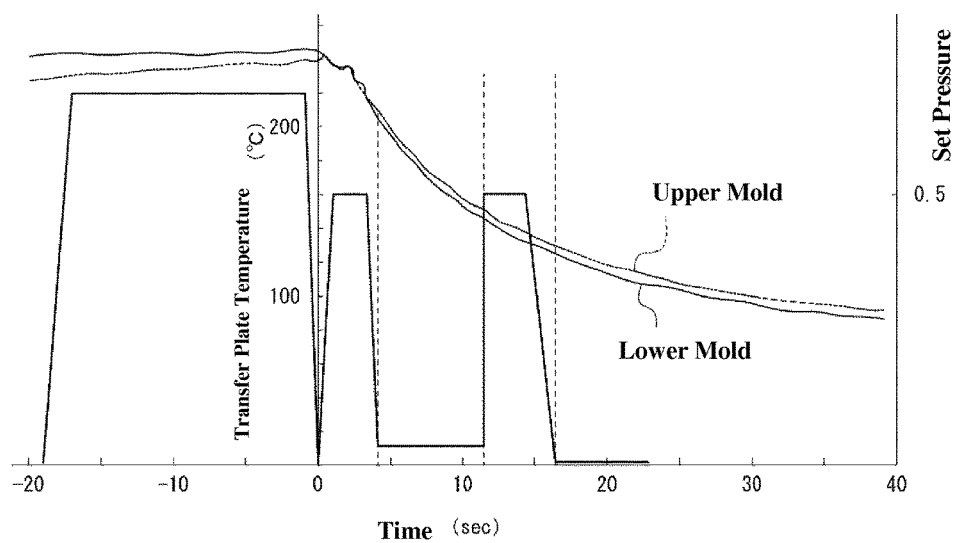
FIG. 8 is a graph showing the relationship between the temperature and the applied pressure in the molds of the transfer molding apparatus shown in FIG. 6.

As shown in FIG. 7A(d), the lower surface of the cooling plate 50 is placed in contact with the upper surface of the upper mold transfer plate 20 to hold the cooling plate 50 and the auxiliary heat insulating plate 51 between the upper mold transfer plate 20 and the upper mold intermediate plate 18. As shown in FIG. 8, a high pressure (but a lower pressure than in the process of heating and pressurizing) is applied to eliminate bubbles (voids) from the resin sheet 25. In one example, the applied pressure may be not less than 0.8 MPa based on the combined gas law to reduce the diameter of bubbles from about 0.4 mm to about 0.1 mm.

Second Cooling Process

Figure 7B:
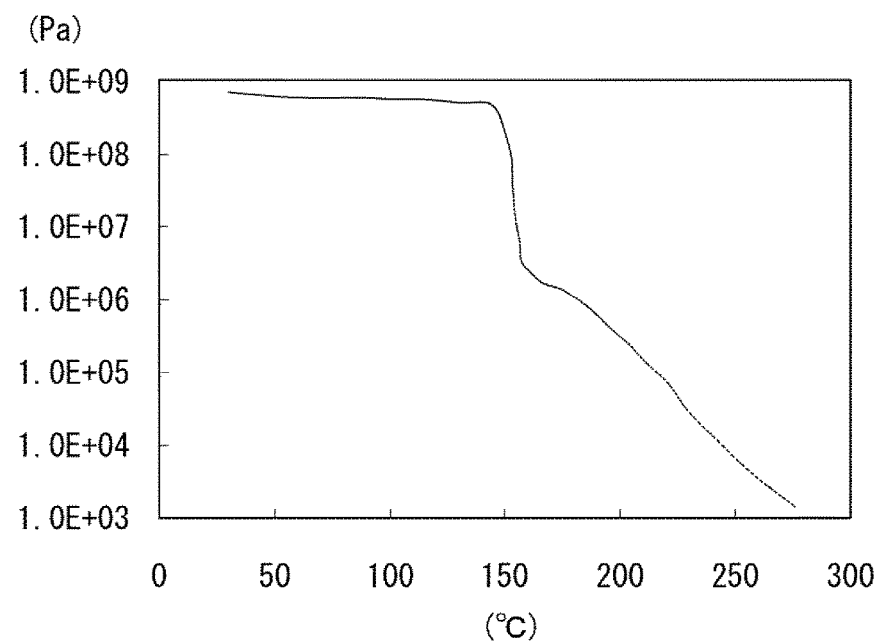
FIG. 7B(a) is a graph showing changes in the elastic modulus of a resin sheet 25 as the temperature of the resin sheet changes, and FIG. 7B(b) is a graph showing changes in the residual stress of the resin sheet as the temperature of the resin sheet changes.
Figure 7B:
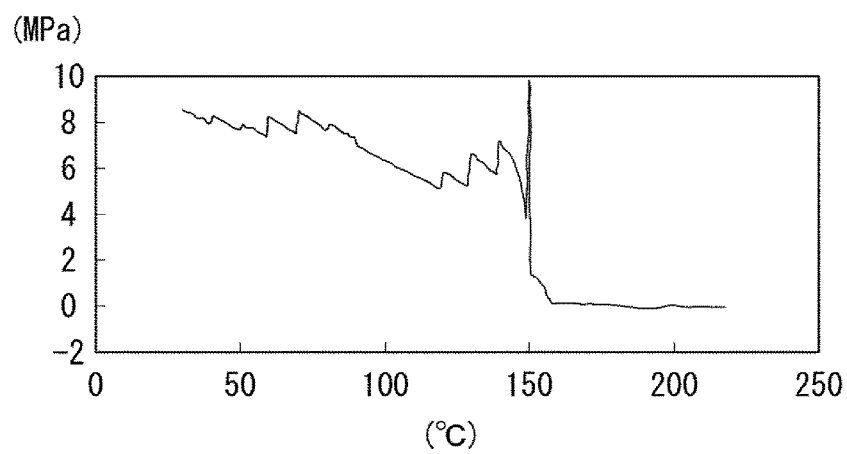

Subsequently, when the resin sheet 25 is cooled to a temperature equal to or less than its melting point (e.g., to 200° C.) (based on time in the second embodiment, or specifically when a first set time elapses from the start of the first cooling process), the pressure is lowered drastically (for example, to 0.1 MPa). As shown in FIG. 7B(a), the resin sheet 25 has a greater elastic modulus and thus undergoes elastic deformation less easily as its temperature decreases. The resin sheet 25 solidifies and loses fluidity at about 150° C., which is the glass-transition temperature. As shown in FIG. 7B(b), when cooled to about 150° C. under pressure applied from the molds, the resin sheet 25 generates residual stress. The resin sheet 25 then becomes elastic like rubber at about 200° C. and generates residual stress. In the second embodiment, the applied pressure is reduced when the resin sheet 25 is cooled to about 200° C. to eliminate residual stress.

Third Cooling Process

When the resin sheet 25 is further cooled to a temperature equal to or less than the glass-transition temperature (e.g., to 150° C.) (based on time in the second embodiment, or specifically when a second set time elapses from the start of the second cooling process), the pressure is raised again (to, for example, not less than 0.5 MPa). The resin sheet 25 is cooled at its upper surface, and thus the temperature distributes unevenly. When the upper surface of the resin sheet 25 is cooled to a temperature equal to or less than the glass-transition temperature and solidifies, the lower surface of the resin sheet 25 may yet to be cooled to such a temperature. In this case, the solidified upper surface portion of the resin sheet 25 cannot shrink when the lower surface portion of the resin sheet 25 shrinks by heat. As a result, the lower surface portion of the resin sheet 25 would warp and have a ridged central portion. To prevent this, the pressure is raised again to forcibly cancel such shrinkage stress.

As described above, the cooling method according to the second embodiment allows the cooling time to be shorter than the air cooling in the first embodiment. More specifically, the direct cooling in the second embodiment takes the cooling time of 55 seconds, whereas the air cooling in the first embodiment takes the cooling time of 110 seconds. In addition to the heat-insulation plates arranged on the upper mold 10 and the lower mold 9, the auxiliary heat insulating plate 51 is arranged on the upper surface of the cooling plate 50. This structure prevents the upper mold 10 from being affected by the low-temperature cooling plate 50, and shortens the recovery time to the subsequent heating and pressurizing.

The resin sheet 25 is cooled in the manner described above, and then the upper mold 10 is raised and the cooling plate 50 is retracted by moving horizontally as shown in FIG. 7A(e). As shown in FIG. 7A(f), the upper mold transfer plate 20 is then raised to complete the single cycle.

Third Embodiment

The system according to a third embodiment includes a cooling mechanism that cools the resin sheet 25 both from above and below, or specifically cools the upper surface of the upper mold transfer plate 20 and the lower surface of the lower mold transfer plate 14 as shown in FIGS. 9(a) to 10(c).

Whereas the system of the second embodiment includes the cooling plate 50 formed integrally with the auxiliary heat insulating plate 51 on its upper surface, the system of the third embodiment includes not only a first cooling plate 52 formed integrally with an auxiliary heat insulating plate 53 on its upper surface, which corresponds to the cooling plate 50, but also a second cooling plate 54 formed integrally with an auxiliary heat insulating plate 55 on its lower surface. The lower mold excluding the lower mold transfer plate 14 is entirely movable to a position at which the lower mold is retracted in the horizontal direction. The first cooling plate 52 and the second cooling plate 54 facing each other in the vertical direction can be placed respectively above and below the resin sheet 25, with the upper surface being in contact with the upper mold transfer plate 20 and the lower surface being in contact with the lower mold transfer plate 14.

Figure 9A:
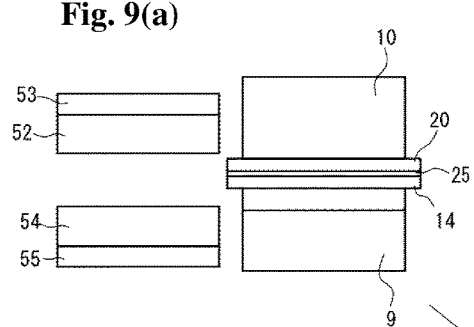
FIGS. 9(a) to 9(d) are diagrams illustrating the operation of each plate of the transfer molding apparatus according to a third embodiment.
Figure 9B:
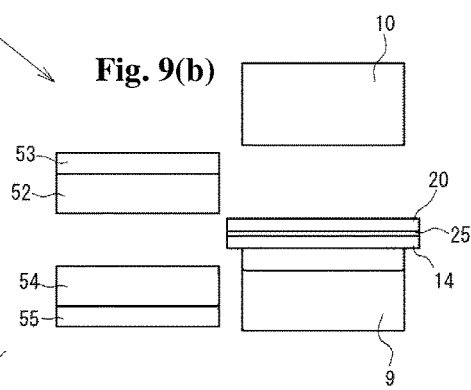
Figure 9C:
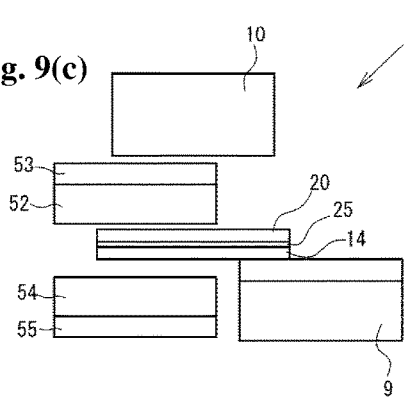
Figure 9D:
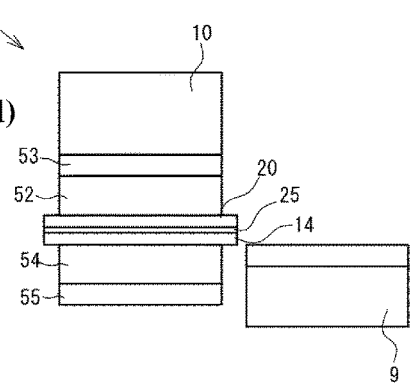

The operation of a transfer molding apparatus 2 including the above cooling mechanism will now be described. As in the first and second embodiments, the preheat process and the transfer molding process are complete as shown in FIG. 9(a), and then the upper mold 10 is raised while the upper mold transfer plate 20 is in contact with the upper surface of the resin sheet as shown in FIG. 9(b). As shown in FIG. 9(c), while the lower mold transfer plate 14 is in contact with the lower surface of the resin sheet 25, the lower mold 9 excluding the lower transfer plate 14 is moved to the retracted position in the horizontal direction. The upper mold transfer plate 20 and the lower mold transfer plate 14 facing each other in the vertical direction are moved in the horizontal direction, and are respectively arranged above and below the resin sheet 25, with the upper surface being in contact with the upper mold transfer plate 20 and the lower surface being in contact with the lower mold transfer plate 14. In this state, the upper mold 10 is lowered to allow the resin sheet 25, having the upper surface in contact with the upper mold transfer plate 20 and the lower surface in contact with the lower mold transfer plate 14, to be supported between the first cooling plate and the second cooling plate as shown in FIG. 9(d). Then, a pressure is applied to the resin sheet 25 to start the cooling process of the resin sheet 25.

As described above, the cooling process uniformly cools the resin sheet 25 from above and below. The process thus eliminates the need to respond to warps in the first to third cooling processes in the second embodiment. More specifically, the single cooling process completes the semifinished plate 46 without warps.

Figure 10A:
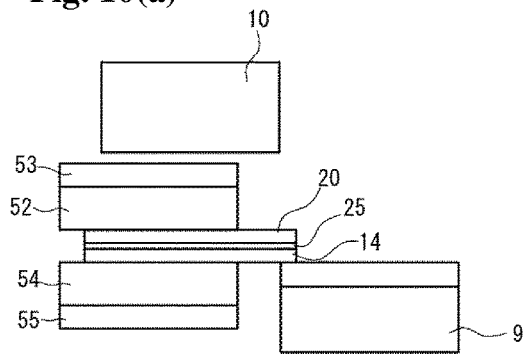
FIGS. 10(a) to 10(c) are diagrams illustrating the operation of each plate of the transfer molding apparatus according to a third embodiment.
Figure 10B:
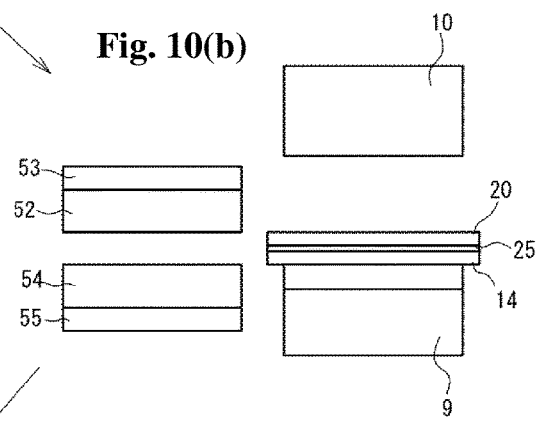
Figure 10C:
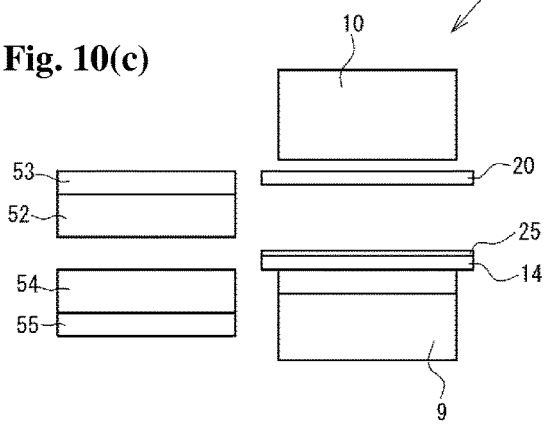

After the cooling process, the first cooling plate 52, the second cooling plate 54, and the lower mold 9 excluding the lower mold transfer plate 14 are moved horizontally to their original positions as shown in FIG. 10(a). When the resin sheet 25 having the upper surface in contact with the upper mold transfer plate 20 and the lower surface in contact with the lower mold transfer plate 14 is placed on the lower mold 9 as shown in FIG. 10(b), the upper mold transfer plate 20 is raised to complete the single cycle as shown in FIG. 10(c).

Other Embodiments

The present invention is not limited to the structures described in the above embodiments, but may be modified in various forms.

For example, although the thick portion 26 is formed by the molten resin sheet 25 partially flowing into the recess in the upper mold transfer plate 20 in one or more of the above embodiments, the thick portion 26 may be formed in the manner described below.

The structure in FIG. 11A(a) allows a non-product portion of the molten resin sheet 25 (excluding its portion corresponding to the light guide plate) to mainly flow into the recess 23. More specifically, the recess 23 formed in the upper mold transfer plate 20 has a side wall 20a corresponding to the non-product portion, and the side wall 20a is higher than other portions of the recess 23. The sidewall 20a defines an inner surface 20b, which is an inclined surface 20b inclined to gradually increase the opening from the bottom surface of the recess 23.

As shown in FIG. 11A(b), the molds are placed close to each other to apply a pressure to the resin sheet 25 in the transfer molding process. This causes the non-product portion of the molten resin to move along the inclined surface 20b of the side wall portion 20a and flow into the recess 23 as shown in FIG. 11A(c). Subsequently, the product portion of the molten resin also moves partially along the inclined surface 20c of the opposite side wall and flows into the recess 23. The side wall 20a is high, and thus allows a sufficiently large amount of molten resin in the non-product portion flows into the recess 23. This reduces the amount of resin to be wasted, and reduces the cost. As a result, the recess 23 is filled with the molten resin as shown in FIG.

11A(d). The subsequent cooling and other processes are the same as described in one or more of the above embodiments, and will not be described.

In the structure shown in FIG. 11B(a), the resin sheet 25 is not melted to partially flow into the recess 23, but the upper mold transfer plate 20 is provided with an additional material (e.g., a resin piece 25a) for filling the recess 23. This structure allows the thick portion 26 to be easily and efficiently formed as shown in FIG. 11B(b).

The structure shown in FIG. 11C(a) includes an additional material formed integrally with the resin sheet 25, or specifically includes a protrusion 25b as a part of the resin sheet 25. According to one or more embodiments of the present invention, the protrusion 25b is thinner than the thick portion 26 and thicker than the resin sheet 25 that has yet to undergo transfer molding. The structure including the protrusion 25b eliminates the need for a mechanism for placing an additional material and thus improves the workability.

Although the upper mold transfer plate 20 has the recess 23 in one or more of the above embodiments, the recess 23 may be formed in the lower mold transfer plate 14, or the recess 23 may be formed in both the upper and lower mold transfer plates.

Although the mold structure includes the upper mold 10 and the lower mold 9 in one or more of the above embodiments, the mold structure may include molds that are open and closed in the horizontal direction.

Although each of the upper mold transfer plate 20 and the lower mold transfer plate 14 has the transfer surface in one or more of the above embodiments, the transfer surface may be formed in one of the upper and lower mold transfer plates. Alternatively, the upper and lower mold transfer plates may be eliminated, and the mold(s) may directly have a transfer surface (e.g., its intermediate plate may have a transfer surface).

Although the entire upper mold transfer plate 20 is heated uniformly in one or more of the above embodiments, the upper mold transfer plate 20 may not be heated uniformly. For example, the upper mold transfer plate 20 may be heated locally in the vicinity of the recess 23. This improves the molten state of the resin in the recess 23, and forms the thick portion 26 in an appropriate manner without sink marks or other defects.

In one or more of the above embodiments, the resin sheet 25 supported between the upper mold transfer plate 20 and the lower mold transfer plate 14 is heated and pressurized to melt the entire resin sheet 25. According to one or more embodiments of the present invention, at least one of the transfer plates 20 and 14 includes a resin flow regulator on its peripheral portion to regulate the flow of the molten resin.

As shown in FIGS. 11D(a)-11D(d), the lower mold transfer plate 14 may include a flow regulator on a peripheral portion of its upper surface. The flow regulator that can prevent the resin from flowing into the surrounding areas may not surround the four sides, but may be discontinuous or may cover only two sides.

FIG. 11D(a) shows the structure including a protrusion 14a as a flow regulator extending from the upper surface of the lower mold transfer plate 14. FIG. 11D(b) shows the structure including a groove 14b as a flow regulator formed in the upper surface of the lower mold transfer plate 14. FIG. 11D(c) shows the structure including a large number of minute protrusions 14c as a flow regulator extending from the upper surface of the lower mold transfer plate 14. FIG. 11D(d) shows the structure including a large number of minute recesses 14 as a flow regulator formed in the upper surface of the lower mold transfer plate 14. Each of these structures may be formed in the upper mold transfer plate 20 or may be formed in each of the transfer plates 14 and 20. The flow regulator is not limited to these examples, but may be in any form that can increase resistance to the flow of the molten resin.

Although the applied pressure in the cooling process is determined as shown in FIG. 8 in one or more of the above embodiments, the pressure may be changed as described below.

For example, the first cooling process may use an applied pressure $P_1$ determined in accordance with the combined gas law (where PV/T is constant) as described below to reduce the diameter of bubbles from 0.4 mm to 0.1 mm.

$$P_0 \times V_0/T_0 = P_1 \times V_1/T_1 \quad (1)$$

where
$P_0$=101325 Pa (the atmospheric pressure)
$V_0$=3.35×10$^{-11}$ m$^3$ (the volume of bubbles with a diameter of 0.4 mm)
$T_0$=240° C.=513K
$V_1$=5.23×10$^{-13}$ m$^3$ (the volume of bubbles with a diameter of 0.1 mm)
$T_1$=190° C.=463K
As a result, $P_1$=5.85 MPa.

With the applied pressure of not less than 5.85 MPa, the diameter of bubbles is reduced from 0.4 mm to 0.1 mm or less.

In the second cooling process, the resin sheet 25 (polycarbonate) is cooled to 190° C. to lower the applied pressure to 0.02 MPa (or to 0 MPa to apply no pressure). This prevents residual stress from being generated.

In the third cooling process, the applied pressure $P_2$ corresponds to the shrinkage stress produced when the resin sheet 25 (polycarbonate) is cooled from 150° C., which is the glass-transition temperature, to 130° C., at which the resin sheet can be released from the molds.
More specifically, $P_2 = E \times \alpha$
E (elastic coefficient)=2.45 GPa
α (linear expansion coefficient of polycarbonate)=7×10$^{-5}$
As a result, $P_2$=3.4 MPa. With a pressure higher than this value (e.g., 6.2 MPa), the resin sheet 25 is prevented from deforming due to shrinkage stress generated by cooling.

Although the preparation process, the transfer molding process, the film applying process, and the cutting process are performed continuously with devices installed in a series in one or more of the above embodiments, these processes may be performed independently, or only some of the processes may be performed continuously. It is only required that the processes are performed in sequence, irrespective of whether these processes are performed continuously or discontinuously. The processes included in the transfer molding process may be performed independently, or some of the processes may be performed continuously.

Although the protrusions and recesses on the transfer surface have maximum heights in the order of submircons in one or more of the above embodiments, the protrusions and recesses may have maximum heights in the order of micrometers (e.g., 200 μm) or in the order of submillimeters (e.g., 1 mm). It is only required that the thick portion 26 has the thickness greater than the maximum height of the protrusions and recesses. In particular, according to one or more embodiments of the present invention, the thick portion 26 has the thickness at least 10 times greater than the maximum height of the protrusions and recesses. The thick portion 26 may have the thickness in the order of submicrometers when the thickness is at least 10 times greater.

Although the resin sheet 25 has a continuous band-like shape in one or more of the above embodiments, a plurality of separate rectangular resin sheets 25 may be used for transfer molding of a single semifinished plate 46 (or two or more semifinished plates) onto each separate resin sheet 25. In this case, rollers that can rotate when driven may be arranged above and below to allow transportation of such separate rectangular resin sheets 25.

Although the transfer molding method is used to prepare the light guide plate in one or more of the above embodiments, the method may be used to prepare a variety of optical components such prism sheets.

Figure 11F:
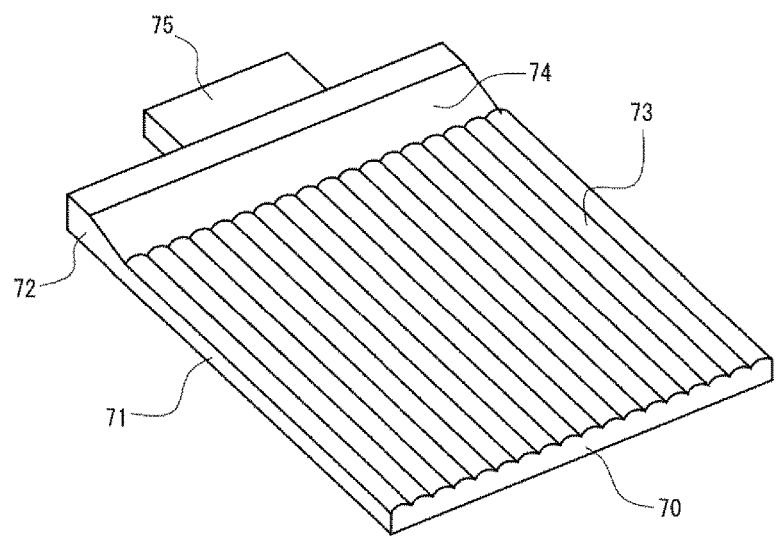
FIG. 11F is a perspective view of a surface light source device including a light guide plate according to another embodiment.

Although the light guide plate is incorporated into the liquid crystal display with the structure shown in FIG. 11E in one or more of the above embodiments, the light guide plate may be modified for use in a surface light source device as shown in FIG. 11F.

The light guide plate 70 shown in FIG. 11F includes a light guide plate member 71 with a substantially uniform thickness, and a wedge-shaped light directing part 72. The light guide plate member 71 has a deflection pattern or a diffusion pattern on its back surface, and includes a lenticular lens 73 having a semicircular cross section on its front surface. The light directing part 72 has an inclined surface 74, which is included from the light directing part 72 toward the light guide plate member 71. The thickness of the light directing part 72 at its end face (light incident surface) is greater than the height of a light source 75.

The surface light source device 11 including the light guide plate 70, in which the thickness of the light directing part 72 at its end face is greater than the height of the light source 75, allows light emitted from the light source 75 to efficiently enter the light directing part 72. The light entering the light directing part 72 is directed toward the light guide plate member 71 while it is widened into planar light. The light is reflected on the deflection pattern or the diffusion pattern and is emitted out of the light guide plate member 71 through its light emitting surface. The light emitted through the light emitting surface undergoes widening of the directivity with the lenticular lens 73.

The surface light source device with this structure can be thin and can improve the light use efficiency of the light source 75.

Although the light guide plate 70 includes the lenticular lens 73 having a semicircular cross section on the surface of the light guide plate member 71, the light guide plate 70 may include a lens with another cross section, such as a prism lens with a triangular cross section.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 material feeder
2 transfer molding apparatus
3 film applicator
4 cutter
5 shaping apparatus
6 main roller
7 roller
8 winding roller
9 lower mold
10 upper mold
11 lower mold support
12 lower mold intermediate plate
13 lower mold heat insulating plate
14 lower mold transfer plate
15 heater
16 micrometer
17 upper mold support
18 upper mold intermediate plate
19 upper mold heat insulating plate
20 upper mold transfer plate
21 retainer plate
22 heater
23 recess
24 arc-shaped area
25 resin sheet
26 thick portion
27 groove
28 opening
29 soft X-ray irradiation unit
30 rod
31 press
32 air supply
33 support roller
34 positioning gripper
35 transporting gripper
36 intake duct
37 exhaust duct
38 application roller
39 protective film
40 jig
41 cutting member
42 groove
43 mounting recess
44 clamp member
45 clamp plate
46 semifinished plate
47 dummy plate
48 cutting tool
49 cutting blade
50 cooling plate
51 auxiliary heat insulating plate

The invention claimed is:

1. A mold structure configured to perform molding, comprising:
   a first mold;
   a second mold configured to be brought together and separated from the first mold;
   a heater on at least one of the first and second molds;
   a transfer member on at least one of the first and second molds, wherein the transfer member is configured to be moved and separated from the at least one of the first and second molds on which the transfer member is disposed during the molding;
   a transfer surface formed on the transfer member that is placed in contact with a resin sheet fed between the first and second molds to perform transfer molding onto the resin sheet; and
   a moving mechanism that moves the at least one of the first and second molds on which the transfer member is disposed away from the transfer member during the molding.

2. A transfer molding apparatus comprising the mold structure according to claim 1.

3. The transfer molding apparatus according to claim 2, wherein the transfer member comprises a cooling unit that cools the transfer member that is maintained in contact with the resin sheet and that has been moved and separated from the at least one of the first and second molds on which the transfer member is disposed.

4. The transfer molding apparatus according to claim 3, wherein the cooling unit is located in a non-transfer area at least when transfer molding is not being performed.

5. The transfer molding apparatus according to claim 4, wherein the cooling unit comprises an intake unit that supplies air to a surface of the transfer member opposite to the transfer surface of the transfer member moved and separated from the at least one of the first and second molds on which the transfer member is disposed.

6. The transfer molding apparatus according to claim 4, the cooling unit comprises a cooling member that comes in contact with a surface of the transfer member opposite to the transfer surface of the transfer member moved and separated from the at least one of the first and second molds on which the transfer member is disposed.

7. The transfer molding apparatus according to claim 3, wherein the cooling unit comprises an intake unit that supplies air to a surface of the transfer member opposite to the transfer surface of the transfer member moved and separated from the at least one of the first and second molds on which the transfer member is disposed.

8. The transfer molding apparatus according to claim 3, the cooling unit comprises a cooling member that comes in contact with a surface of the transfer member opposite to the transfer surface of the transfer member moved and separated from the at least one of the first and second molds on which the transfer member is disposed.

9. The transfer molding apparatus according to claim 8, wherein the cooling member has a temperature not more than a glass-transition temperature of the resin sheet.

10. The transfer molding apparatus according to claim 9, wherein the cooling member has a first surface coming in contact with the surface of the transfer member opposite to the transfer surface, and a second surface having a heat insulator thereon.

11. The transfer molding apparatus according to claim 9, wherein one of the first and second molds located opposite to the cooling unit across the resin sheet comprises a heater, and a heat insulator between the resin sheet and the heater.

12. The transfer molding apparatus according to claim 8, wherein the cooling member has a first surface coming in contact with the surface of the transfer member opposite to the transfer surface, and a second surface having a heat insulator thereon.

13. The transfer molding apparatus according to claim 8, wherein one of the first and second molds located opposite to the cooling unit across the resin sheet comprises a heater, and a heat insulator between the resin sheet and the heater.

14. The transfer molding apparatus according to claim 8, wherein the cooling member is movable in a direction intersecting with a direction in which the first and second molds are brought together and separated.

15. The transfer molding apparatus according to claim 3, wherein the cooling unit comprises one cooling member that cools a surface of the transfer member opposite to the transfer surface,
wherein only one of the first and second molds comprises the transfer member, and
wherein the only one of the first and second molds has a higher temperature than an opposing one of the first and second molds that is disposed opposite the only one of the first and second molds.

16. A transfer molding apparatus comprising:
a mold structure configured to perform molding, comprising:
  a first mold;
  a second mold configured to be brought together and separated from the first mold;
  a heater on at least one of the first and second molds;
  a first transfer member formed on the first mold, wherein the first transfer member is configured to be moved and separated from the first mold during the molding;
  a second transfer member formed on the second mold, wherein the second transfer member is configured to be moved and separated from the second mold during the molding;
  a first transfer surface formed on the first transfer member that is placed in contact with a resin sheet fed between the first and second molds to perform transfer molding onto the resin sheet;
  a second transfer surface formed on the second transfer member that is placed in contact with a resin sheet fed between the first and second molds to perform transfer molding onto the resin sheet;
  a first moving mechanism that moves the first mold away from the first transfer member during the molding; and
  a second moving mechanism that moves the second mold away from the second transfer member during the molding,
wherein the first transfer member comprises a first cooling unit that cools the first transfer member that is maintained in contact with the resin sheet and that has been moved and separated from the first mold,
wherein the second transfer member comprises a second cooling unit that cools the second transfer member that is maintained in contact with the resin sheet and that has been moved and separated from the second mold,
wherein the first and second molds are maintained at a substantially same temperature.

17. The transfer molding apparatus according to claim 16, wherein at least one of the first and second molds reciprocates in a first direction that intersects with a second direction in which the molds are brought together and separated.

* * * * *